UNITED STATES PATENT OFFICE.

THEOPHIL SILBERMANN, OF DRESDEN, GERMANY.

BASIC MAGNESIUM CARBONATE AND PROCESS OF PREPARING SAME.

1,163,475.     Specification of Letters Patent.     Patented Dec. 7, 1915.

No Drawing.     Application filed June 29, 1914. Serial No. 848,056.

*To all whom it may concern:*

Be it known that I, Dr. THEOPHIL SILBERMANN, chemist, subject of the King of Roumania, residing at Dresden, Germany, have invented a certain new and useful Basic Magnesium Carbonate and Process of Preparing Same, of which the following is a specification.

The present process for the preparation of a basic magnesium carbonate is based upon the direct precipitation of solutions of magnesium salts, such for example as the magnesium liquors of the potash industry, in the heat by an aqueous solution of ammonia, which is treated with such a quantity of carbonic acid or mixed with such a quantity of ammonium carbonate (normal, sesqui or double carbonate) that a portion is still present as ammonium hydroxid and the other part is combined with carbonic acid to form normal ammonium carbonate.

The precipitation is always carried out in the heat and the degree of temperature to be employed varies with the proportions of $NH_3$ and $CO_2$ present in the liquid to be precipitated and which must be determined by experiment, and also although in a lesser degree, with the dilution of the solutions employed.

In order to obtain a good precipitation, temperatures above 40° C. are generally necessary, and in order to obtain a particularly voluminous magnesium carbonate, temperatures of from 45° to 60° should be used, while above 70° mostly denser precipitates, and below 40° basic carbonates richer in carbonic acid are obtained.

An important point in the present process is the ratio between free ammonia and combined carbonic acid in the precipitating agent and, furthermore, the ratio between the magnesium of the solution to be precipitated on the one hand and the $NH_3$ and $CO_2$ of the precipitating agent on the other hand. In general there is in the precipitating agent at least 20% and at most 65% of the ammonia to be neutralized (to form $(NH_4)_2CO_3$), while in the reaction mixture the ammonia must always be present in excess proportionally to the magnesium, the amount of carbonic acid does not amount to more than about 63 parts by weight to 24 parts by weight of magnesium, so that the carbonic acid does not suffice for the formation of a double salt of ammonium and magnesium (ammonium-magnesium carbonate $(NH_4)_2Mg(CO_3)_2$), but must only be in moderate excess of the quantity necessary for combination of the whole of the magnesium to form basic carbonate and at the most up to the above given limits of 63 parts by weight of $CO_2$ to 24 parts by weight of Mg.

When the above conditions are observed, there is obtained without any evolution of carbonic acid and by direct precipitation a basic magnesium carbonate, which even when working in very dilute solutions separates quantitatively and the precipitation of which is not prevented by the presence of ammonium chlorid, in contradistinction to precipitations of magnesium salts by means of $NH_3$ or $(NH_4)_2CO_3$ under ordinary conditions. The basic magnesium carbonate so obtained is also different from the basic carbonates found in commerce and considerably superior to them in a technical respect. It is extremely voluminous, contains about 50 per cent. of water of crystallization and is therefore much richer in water of crystallization than the known brands of commerce, loses the greatest part of the water at a low temperature, and is also converted at a much lower temperature with separation of carbonic acid and water (at about 400° to 800°) into a magnesia usta, that is, magnesium oxid (MgO) which like the magnesia carbonica possesses a much greater degree of fineness and particularly also a greater power of reaction than the ordinary article of commerce. According to all experience hitherto gained, the use of the basic magnesium carbonate obtained by the present process affords very important advantages for the india-rubber industry.

Example: The waste liquor of the potash industry, which is a watery solution having a strength of about 40 per cent., $MgCl_2$, 2-4% $MgSO_4$, 0.5% KCl and 0.5% NaCl, is diluted down to about from 4 to 6 per cent. $MgCl_2$ and then mixed with carbonated ammonia, containing about from 8 to 10 per cent. of ammonia and from 4 to 6 per cent. of carbonic acid and in such a manner that the carbonic acid for precipitation is present in very slight excess. Intimate mixture is effected, and the mixture is then heated to about from 45° to 55°, until after standing a short time or even during heating the entire mass assumes a curd-like consistency. After a short time, mostly in less than 15 minutes, the precipitation is complete and filtration may be performed at once. The product is well washed with water, dried and, if necessary disintegrated or pulverized in the ordinary way. The magnesia carbonica may then be converted into magnesia usta by heating or calcination in the well known way.

According to Fresenius in his *Guide to Qualitative Chemical Analysis* 1874, 14th edition, page 117, there is separated from solutions of magnesium salts, when these are mixed with ammonium carbonate (more rapidly from concentrated solutions, more slowly from dilute solutions) a precipitate which, according to the quantity of ammonium carbonate, consists of magnesium carbonate $$MgO.CO_2 + 3aq.$$

or ammonium magnesium carbonate $$NH_4O.CO_2 + MgO.CO_2 + 4aq.$$

Addition of ammonia favors the precipitation very much. Ammonium chlorid acts against it, but is unable to prevent the formation of the precipitate with greater concentration. Fresenius mixed the solution of the magnesium salt with the commercial sesquicarbonate commonly used as a reagent. The acid magnesium carbonate, $Mg(HCO_3)_2$, which is first formed and is soluble in water, decomposes on standing with the formation at first of carbonic acid, after which insoluble magnesium carbonate gradually crystallizes out. The splitting off of the carbonic acid is accelerated by boiling or the addition of ammonia. In the process according to the present application, in which the presence of an excess of ammonia is a condition and the $CO_2$ does not suffice for the formation of the double salt, all the magnesium is precipitated as basic carbonate, when the above conditions are obtained, without the evolution of carbonic acid, even in very dilute solutions, and even in the presence of ammonium chlorid.

What I claim is:—

1. The process for the preparation of basic magnesium carbonate, which consists in treating a magnesium salt solution with partly carbonated ammonia with the aid of heat, care being taken, that in the precipitating medium at least 20 per cent. but not more than 85 per cent. of the ammonia is neutralized by carbonic acid, and that in the reaction mixture there is always an excess of ammonia in comparison with the magnesium, but that the quantity of carbonic acid is moderately in excess over the quantity necessary for binding the whole of the magnesium in the shape of basic carbonate, there being however not more than 63 parts by weight of carbonic acid to 24 parts by weight of magnesium.

2. The process for the manufacture of a basic magnesium carbonate, which consists in diluting effluents containing magnesium chlorid, then mixing it with carbonated ammonia containing from 8 to 10 per cent. of ammonia and from 4 to 6 per cent. of carbonic acid, so that the carbonic acid is slightly in excess over the quantity necessary for combining with the whole of the magnesium in the form of basic carbonate, heating the mixture until it assumes a curd-like consistency, then filtering and drying the product, substantially as described.

3. As a new product, basic magnesium carbonate, being an extremely voluminous granular material, containing about fifty per cent. of water of crystallization, and capable of being converted into a magnesia usta by heating to a temperature between 400 and 800° C., while giving off carbonic acid and water, substantially as described.

In testimony whereof I have hereunto set my hand in presence of two subscribing witnesses.

Dr. THEOPHIL SILBERMANN

Witnesses:
  WOLDEMAR HAUPT,
  HENRY HASPER.

Copies of this patent may be obtained for five cents each, by addressing the "Commissioner of Patents. Washington, D. C."